United States Patent [19]
Je et al.

[11] Patent Number: 5,905,761
[45] Date of Patent: May 18, 1999

[54] AMPLITUDE SHIFT KEYED RECEIVER

[75] Inventors: Young-Ho Je; Jong Young Park, both of Seoul, Rep. of Korea

[73] Assignee: LG Semicon Co., Ltd., Chungcheongbuk-do, Rep. of Korea

[21] Appl. No.: 08/949,032

[22] Filed: Oct. 10, 1997

[30] Foreign Application Priority Data

Oct. 10, 1996 [KR] Rep. of Korea ............. 96/45052

[51] Int. Cl.$^6$ ........................................... H03D 1/02
[52] U.S. Cl. ...................... 375/320; 375/324; 329/304
[58] Field of Search .................................. 375/320, 340, 375/324, 342, 268, 316; 329/304, 306, 312

[56] References Cited

U.S. PATENT DOCUMENTS

| 4,507,795 | 3/1985 | Wagner | 375/342 |
| 4,947,407 | 8/1990 | Silvian | 375/340 |
| 5,319,190 | 6/1994 | Allen et al. | 250/214 |
| 5,319,191 | 6/1994 | Crimmins | 250/214 R |

*Primary Examiner*—Jason Chan
*Assistant Examiner*—Congvan Tran
*Attorney, Agent, or Firm*—Morgan, Lewis & Bockius LLP

[57] ABSTRACT

An amplitude shift keyed (ASK) receiver includes a signal receiving part receiving an amplitude shift keyed signal, a signal detecting part coupled to the signal receiving part and detecting a signal having a carrier frequency and a noise, a pulse detecting part coupled to the signal receiving part and checking the signal from the signal receiving part for compensating errors in the signal detecting part, and a signal determining part coupled to the signal detecting part and the pulse detecting part, the signal determining part determining and restoring a signal to be restored according to output signals from the signal detecting part and the pulse detecting part.

21 Claims, 3 Drawing Sheets

Bus

1bit time

AMPLITUDE SHIFT KEYED RECEIVER

This application claims the benefit of Korean Patent Application No. 45052/1996 filed Oct. 10, 1996, which is hereby incorporated by reference.

BACKGROUND OF THE INVENTION

1. Field of the Invention

The present invention relates to an ASK(Amplitude Shift Keyed) receiver, and more particularly, to an ASK receiver using a digital circuit.

2. Discussion of the Related Art

An ASK technique is a modulation technique used in communication technology. For digital signals such as '0' and '1', one signal is carried with a frequency and the other is carried without a frequency as shown in FIG. 1. A conventional ASK receiver will be explained with reference to FIG. 2.

As shown in FIG. 2, a conventional ASK receiver includes a pre-amplifying part 1 for amplifying an amplitude shift keyed and received signal, a band pass filter 2 for passing a signal only within a predetermined band of the signals from the pre-amplifying part 1, a detector 3 for obtaining an original low frequency signal from an output of the band pass filter 2, a delaying part 4 for delaying a signal from the detector 3 for a predetermined period of time, a signal stretcher 5 for stretching a signal from the detector 3 using a capacitor, a dynamic threshold generator 6 for generating a threshold value for determining whether the received signal exceeds a noise level, and a microprocessor 7.

The operation of the conventional ASK receiver having the aforementioned system will now be explained. Referring to FIG. 2, in order to obtain a signal only within a predetermined band, an amplitude shift keyed and received signal is amplified through the pre-amplifying part 1 and filtered by the band pass filter 2. The filtered signal is received at the detector 3. The detector 3 generates a high bit level pulse if a carrier signal is present and produces a low bit level pulse if no carrier signal is detected. Then, the output signal from the above detector 3 is inputted to the delaying part 4, the signal stretcher 5, and the dynamic threshold generator 6, respectively. The delaying part 4 delays the signal generated from the detector 3 for a predetermined period of time, and the signal stretcher 5 stretches the signal using a capacitor. The dynamic threshold generator 6 produces a threshold value for determining whether a received signal exceeds a noise level. Those signals from the detector 3 delayed for a predetermined period of time by the delaying part 4 that are greater than the threshold value generated from the threshold generator 6 and at the same time have a section greater than the signal stretched in the signal stretcher 5 are produced as a high bit digital signal. The signals in the remaining sections are produced as low bit digital signals. Finally, the outputted values are transmitted to the microprocessor 7 and converted to binary digit signals.

However, the conventional ASK receiver has the following problems. First, the conventional ASK receiver uses an analog signal system which has low reliability and high power consumption. Second, realization of a highly integrated device with other digital circuits is difficult, and a separate analog power source generates high noise level.

SUMMARY OF THE INVENTION

Accordingly, the present invention is directed to an amplitude shift keyed receiver that substantially obviates one or more of the problems due to limitations and disadvantages of the related art.

An object of the present invention is to provide an amplitude shift keyed receiver with high reliability and lower power consumption.

Additional features and advantages of the invention will be set forth in the description which follows, and in part will be from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the amplitude shift keyed receiver using an infrared ray used therein includes a signal receiving part receiving an amplitude shift keyed signal, a signal detecting part coupled to the signal receiving part and detecting a signal having a carrier frequency and a noise, a pulse detecting part coupled to the signal receiving part and checking a signal from the signal receiving part for compensating errors in the signal detecting part, and a signal determining part coupled to the signal detecting part and the pulse detecting part and determining and restoring a signal to be restored according to output signals from the signal detecting part and the pulse detecting part.

In another aspect of the present invention, the receiver includes a pre-amplifying part amplifying a received amplitude shift keyed signal to a predetermined amplitude, a quantizing part coupled to the pre-amplifying part and amplifying a signal from the pre-amplifying part and digitizing the signal, an ASK edge counting part coupled to the quantizing part and determining a presence of carrier frequency in a signal from the quantizing part, an oscillating part coupled to the ASK edge counting part and generating a clock signal at predetermined intervals and informing the ASK edge counting part to start count edges of the amplitude shift keyed signal, a comparing part coupled to the ASK edge counting part and comparing an output from the ASK edge counting part with a predetermined reference value, a pulse detecting part coupled to the signal receiving part and checking a signal from the signal receiving part for compensating errors in the oscillating part, the ASK edge counting part, and the comparing part, a counter and random part coupled to the comparing part and the pulse detecting part and combining signals from the ASK edge counting part and the pulse detecting part to restore a signal, and a hexadecimal counting part coupled to the counter and random part and a clock signal and receiving signals from the counter and random part and the clock signal and restoring the signal to original signal.

It is to be understood that both the foregoing general description and the following detailed description are exemplary explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
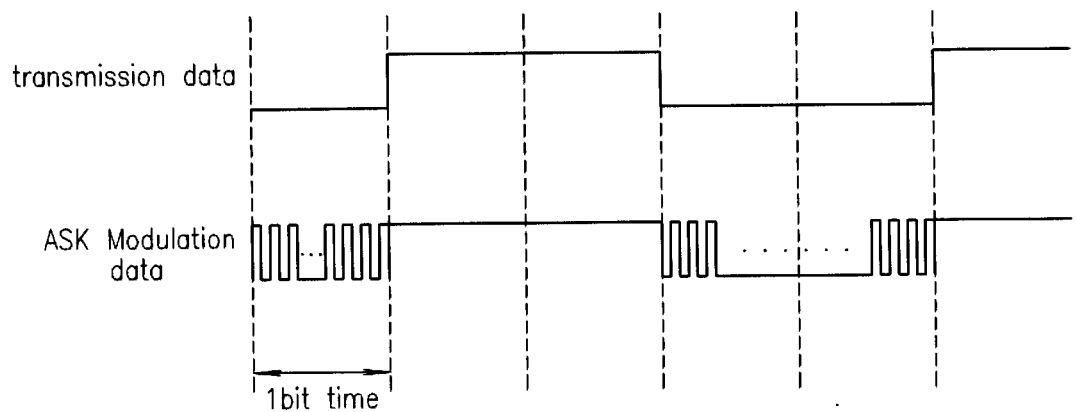
FIG. 1 illustrates digital signals carried with a frequency and without a frequency.
Figure 2:
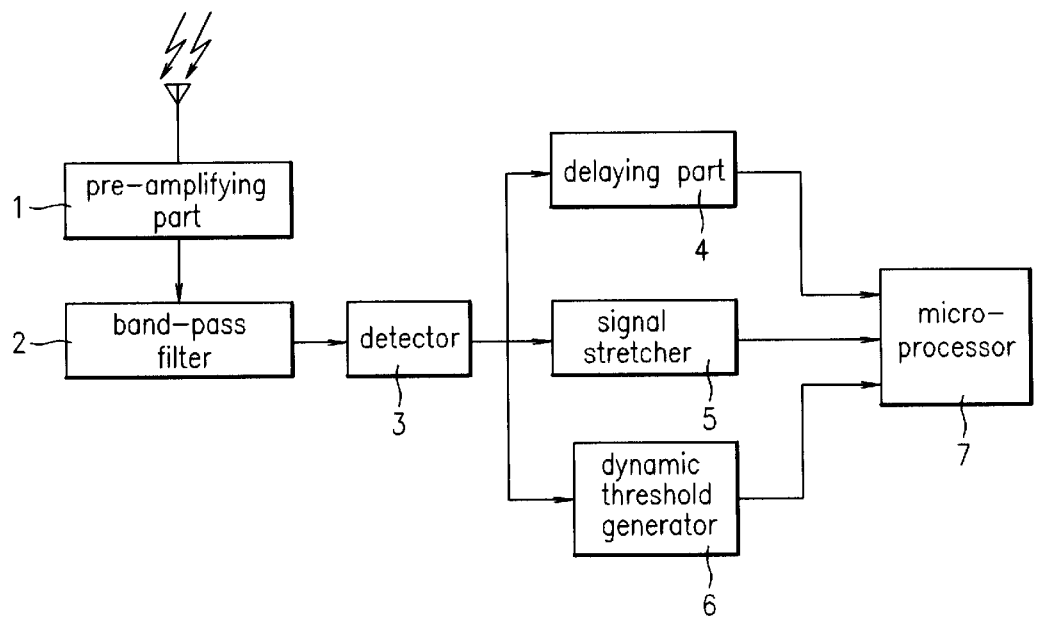
FIG. 2 illustrates a system block diagram of a conventional amplitude shift keyed receiver.
Figure 3:
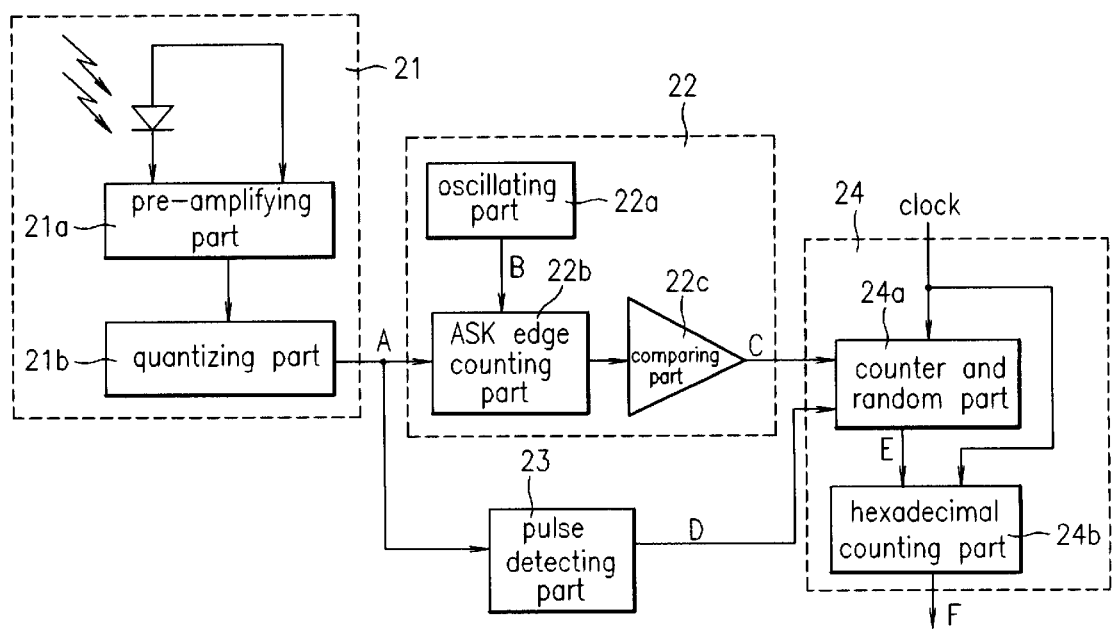
FIG. 3 illustrates a system block diagram of an amplitude shift keyed receiver in accordance with a preferred embodiment of the present invention.

FIG. 3 is an example of a device suitable for short distance radio communications such as communications between personal computers or personal computer to printer.

As shown in FIG. 3, the amplitude shift keyed receiver of the present invention includes a signal receiving part 21 for receiving an amplitude shift keyed (ASK) signal. A signal detecting part 22 detects a signal having a carrier frequency (or signal having no carrier frequency) from the received ASK signal and also detects noise. A pulse detecting part 23 checks a signal from the signal receiving part 21 by a predetermined unit for compensating errors in the signal detecting part 22. A signal determining part 24 determines and restores a signal to be restored according to output signals from the signal detecting part 22 and the pulse detecting part 23.

The signal receiving part 21 has a pre-amplifying part 21a and a quantizing (or digitizing) part 21b. After amplifying the amplitude shift keyed input signal to a predetermined amplitude in the pre-amplifying part 21a, the signal receiving part 21 digitizes the amplified signal in the quantizing part 21b. The signal receiving part 21 produces a signal having an amplitude shift keyed carrier frequency corresponding to a binary digit. On the other hand, the signal receiving part 21 outputs a signal without a carrier frequency (low bit data) for the remaining binary digits.

The signal detecting part 22 includes an oscillating part 22a, an ASK edge counting part 22b, and a comparing part 22c. The oscillating part 22a generates a clock signal for a predetermined cycle (for example, a counting cycle of 13 µs) informing the ASK edge counting part 22b to start counting. For example, the oscillating part 22a generates a 1 µs pulse during a 13 µs cycle. That is, pulses having '0' during 12 µs and having '1' during 1 µs are generated. The pulses are generated by, for example, 13 counters receiving a 1 MHZ clock signal. The ASK edge counting part 22b counts up the edges of the amplitude shift keyed and received signal according to the clock signal for a predetermined cycle received from the oscillating part 22a. The clock signal of a predetermined cycle informing the ASK edge counting part 22b to start counting generated in the oscillating part 22a is produced at predetermined intervals irrespective of bit time.

Accordingly, the ASK edge counting part 22b determines a presence of the carrier frequency every 13 µs, for example. In other words, the ASK edge counting part 22b counts a pulse edge for 12 µs during the 13 µs cycle. The ASK edge counting part 22b is cleared during the remaining 1 µs, and the counted value is applied to the comparing part 22c. The comparing part 22c compares the counted value from the ASK edge counting part 22b with a predetermined reference value. As an example, for a received ASK carrier frequency of 500 KHz, the comparing part 22c uses a predetermined reference value of 6. For example, if data in a high section of the pulse in the quantized signal is "1" and the other section is "0", the ASK counting part 22c counts a number of pulse edges in the high section.

In an IR(Infrared) communication, in general, a signal oscillation of 500 KHz is made for data of "1" and a low bit data is outputted for data of "0". For data of "1," a count is performed 6 times during 13 µs. For example, when a transmission rate is as low as 2400 bps, a cycle of one bit time is 417 µs. Since the signal has a frequency of 500 KHz, approximately 208 pulses are present in one bit time. The comparing part 22c determines within ±20% error whether the signal has a carrier signal by comparing a received counted value to a reference value. The comparing part 22c determines that the signal has a carrier signal if the counted value from the ASK edge counting part 22b falls in a range of "4" to "8" which is a value after considering the ±20k error on 6 pulses. If the counted value is not within the range, the comparing part 22c determines that the signal has no carrier signal.

The pulse detecting part 23 generates a signal for compensating errors of the signal detecting part 22 and includes a counter and a control logic. As explained above, for the normal ASK signal without any noise, the signal oscillates with a frequency of 500 KHz for "1" data. However, even for cases where it is certain that the data is "1," if the signal has a weak noise in any of the section oscillating with the 500 KHz frequency, a pulse width oscillating with the 500 KHz in a portion having the noise becomes longer. If this happens, the counted value of the pulse edge portions in predetermined intervals in the ASK edge counting part 22b does not satisfy the predetermined range of 4 to 8. Accordingly, even though it is "1" data, the "1" data is not detected as "1" data. However, the pulse detecting part 23 compensate for such an error. Then, the signal determining part 24 receives output signals from the comparing part 22c and the pulse detecting part 23.

The signal determining part 24 includes a counter and random part 24a and a hexadecimal counting part 24b. The counter and random part 24a and a hexadecimal counting part 24b receive the outputs from the pulse detecting part 23 and the comparing part 22c and remove the possibility of signal distortion from noises. Specifically, the counter and random part 24a combines the signals from the ASK edge counting part and the pulse detecting part to restore a signal. In addition, the counter and random part 24a transmits a binary digit corresponding to one bit time to the hexadecimal counting part 24 at a transmission rate (for example, 2400, 4800, or 9600 bps) using a clock signal having a speed 16 times the signal transmission rate.

The operation of the ASK receiver in accordance with a preferred embodiment of the present invention will now be explained.

Referring to FIG. 3, an amplitude shift keyed signal received externally from the ASK receiver is amplified to a predetermined amplitude in the pre-amplification part 21a and quantized in the quantizing part 21b. The quantized signal includes a signal having an ASK carrier frequency corresponding to one binary digit and signals having no carrier frequency for the remaining binary digits. The output from the signal receiving part 21 is sent to the signal detecting part 22 including the ASK edge counting part 22b and to the pulse detecting part 23. The ASK edge counting part 22b counts edge portions of signals that is outputted from the signal receiving part 21 in every 13 µs intervals generated in the oscillating part 22a. Counting the edge portions determines whether the transmitted signal has a carrier frequency. When a next oscillation frequency is generated, the ASK counting part 22b is cleared, and the counted value is transmitted to the comparing part 22c.

The comparing part 22c determines whether the signal has a carrier frequency by comparing the counted value received from the ASK edge counting part 22b with a reference value. In other words, the comparing part 22c confirms that a signal has a carrier frequency if the counted value falls in a range of 4 to 8, for example, where the reference value is 6. Conversely, it is determined that the signal has no carrier frequency if the counted value is not in the range. The pulse detecting part 23 generates a signal when a data exists in the signal outputted from the signal receiving part 21. The signal generated considers the signal from the signal receiving part 21 as a normal signal even if the signal partly has a weak noise.

Outputs from the pulse detecting part 23 and the comparing part 22c are transmitted to the signal determining part 24. The counter and random part 24a in the signal determining part 24 outputs the signals in the sections where the signals outputted from the pulse detecting part 23 and the comparing part 22c are identical while using a clock signal having a speed 16 times the signal transmission rate. The hexadecimal counting part 24b receives a signal from the counter and random part 24a and restores the signal to the original signal.

FIGS. 4A–4F illustrate signal timings in the amplitude shift keyed receiver of the present invention.

Figure 4A:
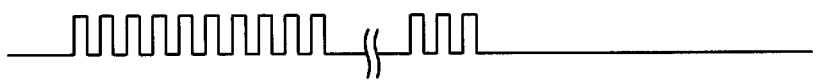
FIGS. 4A–4F illustrate signal timings in the amplitude shift keyed receiver of the present invention.
Figure 4B:
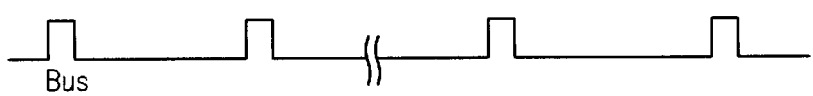
Figure 4C:
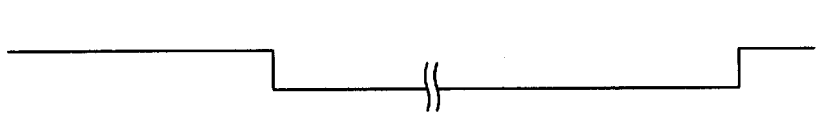

FIG. 4A represents a signal from the signal receiving part 21 which oscillates with 500 KHz frequency if the signal data is "1" and maintains a low signal if the signal data is "0". FIG. 4B represents a signal from the oscillating part 22a having pulse duration of 13 μs, for example. These pulses act as a clock signal to count oscillating pulse edge portions in the output signal from the signal receiving part 21. FIG. 4C represents a pulse waveform from the comparing part 22c showing a result of the counted oscillating pulse edge portion of an output signal from the signal receiving part 21 executed by the ASK edge counting part 22b under the control of the oscillating part 22a. That is, if the result of edge portion counting of the pulses for 13 μs falls in the range of 4 to 8, where the reference value is 6, the pulse changes to a low level.

Figure 4D:
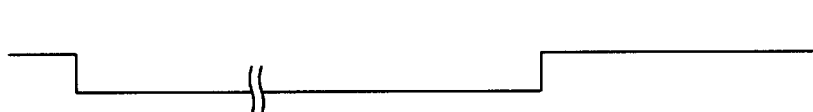

FIG. 4D represents a waveform from the pulse detecting part 23. The signal is changed to a low level when the outputted signal from the signal receiving part 21 starts to oscillate. In this process, the signal shown in FIG. 4D should be changed to a high level again if the signal from the signal receiving part 21 does not oscillate. The signal is maintained as the low level for a predetermined period of time to compensate for the possible error which can occur when the oscillating pulses of the signal from the signal receiving part 21 contain weak noises.

Figure 4E:
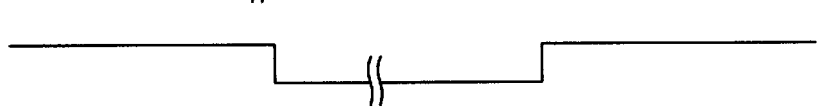
Figure 4F:
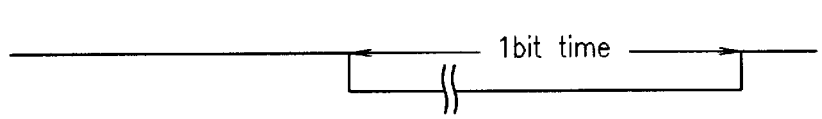

FIG. 4E represents a waveform from the counter and random part 24a. The signal is a waveform selectively taken from portions of the waveforms from the comparing part 22c (FIG. 4C) and the pulse detecting part 23 (FIG. 4D) that satisfies the two waveforms simultaneously. The waveform from the counter and random part 24a is restored into an original signal for one bit time, as shown in FIG. 4F, by the hexadecimal counting part 24b.

Accordingly, the ASK receiver of the present invention has the following advantages. First, the ASK receiver using a digital circuit improves its reliability. Second, integration of the receiver with other digital circuits is easy. Third, an ASK receiver having a lower noise can be designed using a low power consumption source.

It will be apparent to those skilled in the art that various modifications and variations can be made in the amplitude shift keyed receiver of the present invention without departing from the spirit or scope of the invention. Thus, it is intended that the present invention cover the modifications and variations of this invention provided they come within the scope of the appended claims and their equivalents.

What is claimed is:

1. An amplitude shift keyed receiver comprising:
   a signal receiving part receiving an amplitude shift keyed (ASK) signal;
   a signal detecting part coupled to the signal receiving part and detecting a signal having a carrier frequency and a noise;
   a pulse detecting part coupled to the signal receiving part and checking the signal from the signal receiving part for compensating errors in the signal detecting part; and
   a signal determining part coupled to the signal detecting part and the pulse detecting part, the signal determining part determining and restoring a signal to be restored according to output signals from the signal detecting part and the pulse detecting part.

2. The amplitude shift keyed receiver according to claim 1, wherein the signal receiving part includes a pre-amplifying part coupled to a quantizing part.

3. The amplitude shift keyed receiver according to claim 2, wherein the quantizing part amplifies a signal from the pre-amplifying part and digitizes the signal.

4. The amplified shift keyed receiver according to claim 1, wherein the signal detecting part includes:
   an ASK edge counting part coupled to the signal receiving part;
   an oscillating part coupled to the ASK edge counting part; and
   a comparing part coupled to the ASK edge counting part.

5. The amplitude shift keyed receiver according to claim 4, wherein the oscillating part generates a clock signal at predetermined intervals and triggers the ASK edge counting part to start counting.

6. The amplitude shift keyed receiver according to claim 4, wherein the ASK edge counting part determines a presence of carrier frequency in a signal from the signal receiving part at predetermined intervals.

7. The amplitude shift keyed receiver according to claim 4, wherein the ASK edge counting part has a tolerance of ±20% error for an input signal.

8. The amplitude shift keyed receiver according to claim 4, wherein the ASK edge counting part has a constant counting interval respective of a bit time.

9. The amplitude shift keyed receiver according to claim 4, wherein the comparing part compares an output from the ASK edge counting part to a reference value.

10. The amplitude shift keyed receiver according to claim 9, wherein the predetermined reference value includes a range of 4 to 8.

11. The amplitude shift keyed receiver according to claim 1, wherein the signal determining part includes:
   a counter and random part receiving a clock signal and signals from the signal detecting part and the pulse detecting part; and
   a hexadecimal counting part receiving the clock signal and an output signal form the counter and random part.

12. The amplitude shift keyed receiver according to claim 11, wherein the counter and random part combines signals from an ASK edge counting part and the pulse detecting part to restore a signal.

13. The amplitude shift keyed receiver according to claim 12, wherein the counter and random part transmits a binary digit corresponding to one bit time to the hexadecimal counting part at a transmission rate using a clock signal having a speed 16 times the transmission rate.

14. The amplitude shift keyed receiver according to claim 1, wherein the signal receiving part outputs a signal having an amplitude shift keyed carrier frequency corresponding to a binary digit and a signal without the carrier frequency for the remaining binary digits.

15. An amplitude shift keyed receiver comprising:

a pre-amplifying part amplifying a received amplitude shift keyed (ASK) signal to a predetermined amplitude;

a quantizing part coupled to the pre-amplifying part and amplifying an output signal from the pre-amplifying part and digitizing the output signal to produce a quantized signal;

an ASK edge counting part coupled to the quantizing part and determining a presence of carrier frequency in the quantized signal from the quantizing part;

an oscillating part coupled to the ASK edge counting part and generating a clock signal at predetermined intervals and triggering the ASK edge counting part to start counting edges of the amplitude shift keyed signal;

a comparing part coupled to the ASK edge counting part and comparing an output from the ASK edge counting part to a reference value;

a pulse detecting part coupled to the quantizing part and checking the output signal from the quantizing part for compensating errors in the oscillating part, the ASK edge counting part, and the comparing part;

a counter and random part receiving a clock signal and coupled to the comparing part and the pulse detecting part and, counting and random part combining signals from the ASK edge counting part and the pulse detecting part to restore a signal; and a hexadecimal counting part coupled to the counter and random part and receiving an output signal from the counter and random part and the clock signal and restoring the received ASK signal to a corresponding original signal.

16. The amplitude shift keyed receiver according to claim 15, wherein the ASK edge counting part has a tolerance of ±20% error for an input signal.

17. The amplitude shift keyed receiver according to claim 15, wherein the ASK edge counting part has a constant counting interval irrespective of a bit time.

18. The amplitude shift keyed receiver according to claim 15, wherein the ASK edge counter and random part combines signals from the ASK edge counting part and the pulse detecting part to restore the received ASK signal.

19. The amplitude shift keyed receiver according to claim 15, wherein the reference value includes a range of 4 to 8.

20. The amplitude shift keyed receiver according to claim 15, wherein the counter and random part transmits a binary digit corresponding to one bit time to the hexadecimal counting part at a transmission rate using the clock signal, the clock signal having a speed 16 times the transmission rate.

21. An amplitude shift keyed receiver comprising:

a signal receiving unit receiving an amplitude shift keyed (ASK) signal, the signal receiving part including;

a pre-amplifying part amplifying the received ASK signal to a predetermined amplified, and a quantizing part coupled to the pre-amplifying part and amplifying an output signal from the pre-amplifying part and digitizing the output signal to produce a quantized signal, a signal detecting unit coupled to the signal receiving unit and detecting a signal having a carrier frequency and a noise, the signal detecting unit including;

an ASK edge counting part coupled to the quantizing part and determining a presence of carrier frequency in the quantized signal from the quantizing part, an oscillating part coupled to the ASK edge counting part and generating a clock signal at predetermined intervals and triggering the ASK edge counting part to start counting edges of the amplitude shift keyed signal, and a comparing part coupled to the ASK edge counting part and comparing an output from the ASK edge counting part to a reference value, a pulse detecting unit coupled to the signal receiving part and checking the signal from the signal receiving part for compensating errors in the signal detecting part; and a signal determining unit coupled to the signal detecting unit and the pulse detecting unit, the signal determining unit determining and restoring a signal to be restored according to output signals from the signal detecting unit and the pulse detecting unit, including, a counter and random part receiving a clock signal and coupled to the comparing part and the pulse detecting part and, the counting and random part combining signals from the ASK edge counting part and the pulse detecting part to restore a signal, and a hexadecimal counting part coupled to the counter and random part and receiving an output signal from the counter and random part and the clock signal and restoring the received ASK signal to a corresponding original signal.

* * * * *